Jan. 10, 1950 M. F. BOOTH 2,494,469
EDUCATIONAL TOY
Filed Sept. 13, 1946 2 Sheets-Sheet 2
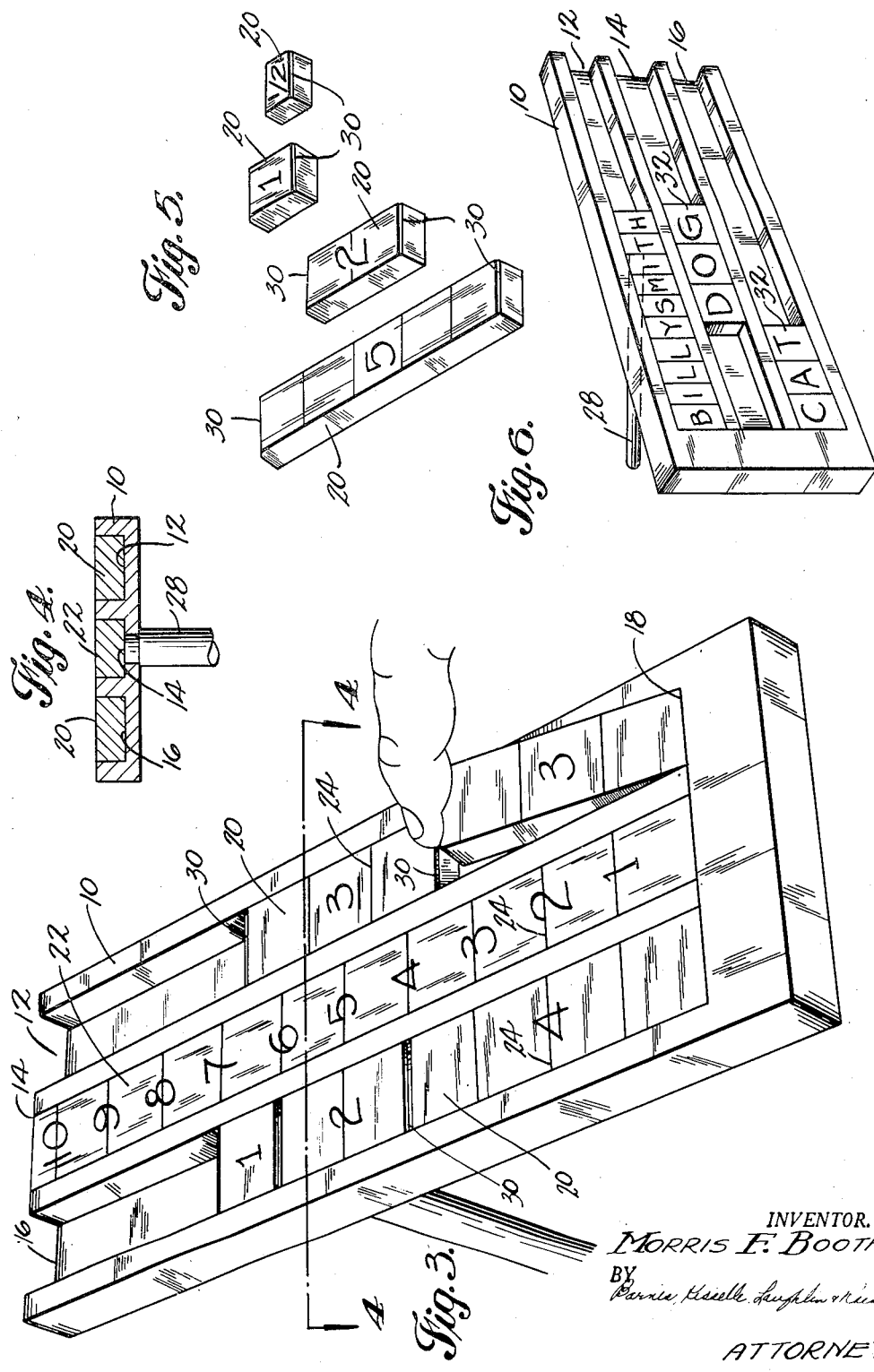
INVENTOR.
MORRIS F. BOOTH.
BY
ATTORNEYS.

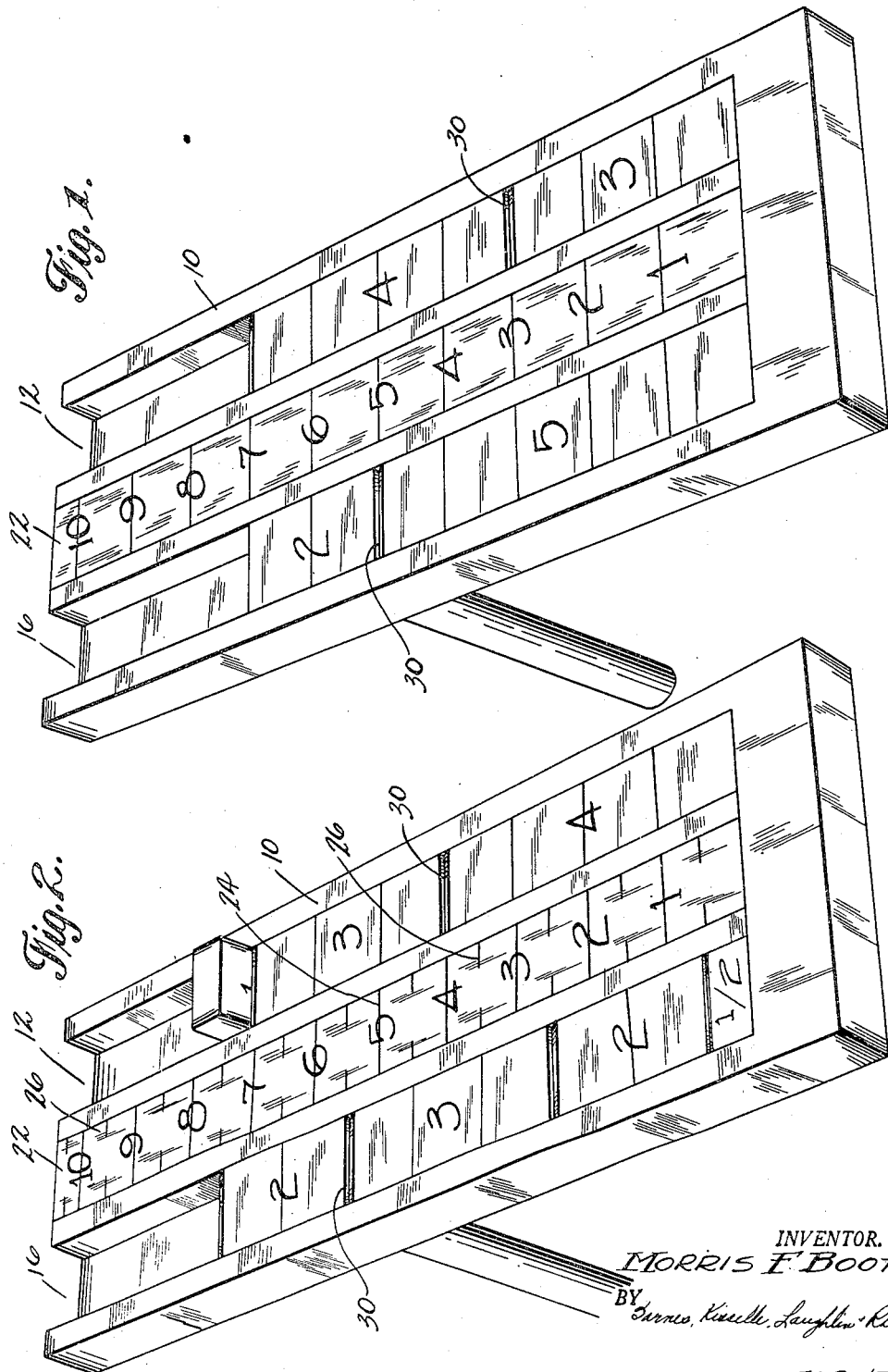

Patented Jan. 10, 1950

2,494,469

UNITED STATES PATENT OFFICE 2,494,469

EDUCATIONAL TOY

Morris F. Booth, Alden, Mich.

Application September 13, 1946, Serial No. 696,629

5 Claims. (Cl. 35—73)

This invention relates to an educational toy and more particularly to a toy which enables children to learn by visualization.

It is well recognized that children learn more readily by association of visual representations than by memorizing and that facts learned in this manner are retained longer by the child. This is especially true of the rudimentary arithmetic processes such as adding, subtracting, etc. By presenting to the eye a plurality of similarly shaped objects such as blocks, the youthful mind is enabled to comprehend quantities by mechanical means rather than by abstract reasoning.

It is therefore an object of this invention to provide a device in which a plurality of blocks may be manipulated to give an arithmetical result which may be visually observed by a child.

Another object of this invention is to provide a device in which the same parts may be used to perform a plurality of arithmetic processes.

A further object of my invention is the provision of a device which is adapted for teaching children the use of fractions as well as whole numbers.

An additional object of my invention is the provision of an arithmetic teaching device which is adapted for teaching other subjects as well.

In the drawings wherein the preferable embodiment of my device is shown:

Figure 1 is a perspective view of my device as it is used for addition of whole numbers.

Figure 2 is a perspective view of my device as it is used for addition of whole numbers and fractions.

Figure 3 is a perspective view showing the manner in which the device may be used for subtraction.

Figure 4 is a sectional view taken along line 4—4 of Figure 3.

Figure 5 is a perspective view of some of the individual blocks which are used in performing the arithmetic processes.

Figure 6 is a perspective view of my device as it is used as an aid for teaching spelling.

In the drawings there is shown a rectangular base member 10 having three parallel recessed guides 12, 14, and 16 extending longitudinally thereof which are open at the upper end and closed by shoulder 18 adjacent the lower end of base 10. Blocks 20 which are adapted to be slidably retained in guides 12 and 16 are numbered consecutively up to ten or higher and have lengths proportional to the number impressed thereon. That is, block numbered 5 is five times as long as block number 1 and one-half as long as block number 10. All the blocks are the same thickness which is equivalent to one-half the length of block number 1.

The center recess 14 is adapted to retain answer block 22 one face of which is longitudinally divided into units 24 of equal length which are numbered to correspond with the lengths of blocks 20. When number 3 block is inserted in either outer guide 12 or 16, its upper edge coincides with division 3 on block 22 and if block number 7 is inserted in one of said guides its upper edge is aligned with the line designating division 7. Likewise, if blocks 3 and 4 are inserted in one of the guides the upper edge of the higher block coincides with the line on block 22 corresponding to seven units.

Simple addition of whole numbers thus becomes obvious. The child merely inserts the blocks corresponding to the numbers he wishes to add in one of the outer guides and the sum is instantly indicated by the numbered division line on the answer block 22 which is aligned with the upper edge of the top block. In this manner a child is able to comprehend the magnitude of numbers as well as understand the manner in which they may be added to give a total.

By inserting blocks 20 in both outer columns as is shown in Figure 1 a child is further enabled to observe comparative sums. That is, he can see that five plus two and four plus three both equal the sum of seven and in this manner further understand the relative magnitude of different numbers.

To teach children the use of fractions the opposite face of answer block 22 is provided with further division lines 26 spaced medially between divisions 24 as is shown in Figure 2. As previously mentioned the thickness of blocks 20 are equivalent to one-half unit and therefore the shorter ones such as blocks 1 and 2 may be conveniently inserted in guides 12 and 16 endwise as shown in Figure 2 to indicate half units on the answer block. After the child has become thoroughly familiar with the use of whole numbers the answer block 22 may be reversed in guide 14 and blocks 22 may be inserted endwise as well as longitudinally to acquaint the child with fractions. Of course instead of inserting blocks endwise to indicate fractions, blocks whose length corresponds to fractional units can also be used as is shown in the left hand column of Figure 2.

The same block arrangement may be used for subtraction as well as addition. As shown in Figure 3, if a column of numbers totals 6 and it is desired to subtract 3 therefrom, the number 3 block is withdrawn from the guide and the remaining blocks slide down the guide and indicate the remainder on the answer block in the same manner as described for addition. To facilitate sliding action of the remaining blocks when one or more blocks are removed from the column, the base is supported in an inclined position by suitable means such as the leg support 28 on the under side of base 10.

It will be observed that the upper face of blocks 22 are chamfered at the edges 30. This enables a child to remove any block in the column with ease by merely inserting a finger between the chamfered edges, to separate them and then withdrawing the block desired.

From the foregoing description it can readily be seen how the device may be used to teach multiplication and division as well. To multiply 2 by 5, five number 2 blocks are inserted in one of the outer guides and the result 10 is indicated on the answer block. Division is performed with equal facility. To divide 10 by 2, number 2 blocks are inserted in one of the outer guides until a total of ten is indicated by the answer block. The child then merely counts the number of 2 blocks required to determine that 10 divided by 2 equals 5.

As shown in Figure 6 base 10 may also be positioned so that guides 12, 14 and 16 lie in horizontal planes when it is desired to use this device for spelling. For this purpose lettered blocks 32 are provided which may be inserted in the horizontal guides for spelling words and composing sentences.

It will be observed that base 10 might be provided with a single guide instead of three as shown in the drawings by making the guide deep enough to retain both the answer block and the number blocks. If the answer block is positioned along the bottom of the guide and the adding blocks inserted on top of the answer block, the result would then be similarly indicated on the answer block at the upper edge of the top block superimposed thereon.

In addition to teaching arithmetic the device shown may also be used to familiarize children with related matters, such as books and authors, states and state capitals, etc. For example, in the case of states and state capitals the names of states may be designated on one long block, each name positioned a different distance from the bottom of the block, and the state capitals designated by shorter blocks, the length of each block corresponding to the position of its related state on the answer block. By locating the block which aligns with a state designated on the answer block, a child can determine for himself the capital of any state and by means of the visual representation the association of the city and the state becomes more permanently impressed upon his mind. In a similar manner the device may be used for teaching many other related facts.

It will thus be seen that my device provides a method of teaching children by association of visual representations which is much simpler and more easily understood than the reasoning and memory processes. After the child becomes familiar with the use of small numerals and simple subjects, the base may be provided with an extension to include larger numbers and blocks relating to other subjects such as historical dates, musical compositions, etc., may be added.

I claim:

1. In combination a device having a plurality of parallel recessed guides, a block adapted to be retained in one of said guides and having on one side thereof equal divisions along the length thereof, said divisions being numbered consecutively starting from one, the other side of said block having similar numbered divisions which are further equally subdivided, and blocks having lengths corresponding to the distance from one end of said first mentioned block to any of the numbered divisions thereon and a thickness equivalent to the length of at least one of said subdivisions so that when said last mentioned blocks are inserted lengthwise in the form of a column in one of said guides, the height of said column corresponds to a number of divisions on one side of said first mentioned block and when inserted endwise the height of the column corresponds to a number of subdivisions on the other side of said first mentioned block.

2. In combination a device having one or more recessed guides, a block adapted to be retained in one of said guides and being longitudinally divided into equal units consecutively numbered on one side thereof, the other side of said block being divided into similar numbered units and in addition thereto said units being divided into smaller equal units, and numbered blocks adapted to be retained as a column in said guides, said last mentioned blocks having lengths corresponding to a number of units on said first mentioned block and a thickness corresponding to the smallest unit on said first mentioned block whereby the height of a column of said last mentioned blocks corresponds to the units on one side of said first mentioned block when inserted in said guides axially and corresponds to the units on the other side of said first mentioned block when inserted endwise in said guides.

3. In a device of the class described the combination of an inclined base adapted to slidably retain blocks in parallel columns, a block having multiple units of length indicated on one side thereof by consecutive numerals and fractions of said unit lengths indicated on the other side thereof, and blocks having lengths which correspond to one or more of said unit lengths and a thickness corresponding to said fractional units, whereby said last mentioned blocks may be retained by said base both lengthwise and endwise and the total unit length of said column of blocks is indicated by its numerical equivalent on one face of said first mentioned block.

4. In combination, a base having one or more recessed guides adapted to retain blocks in parallel columns, a long block adapted to be retained in one of said guides and being longitudinally divided into a plurality of equal basic units, said units being further divided into small units and a plurality of small blocks having lengths equal to integral multiples of said basic units, the thickness of said smaller blocks corresponding to said smaller units, whereby when said smaller blocks are arranged both endwise and lengthwise in a column on said base adjacent said long block, the total length of said column of smaller blocks is indicated on said long block.

5. In combination, a base having one or more recessed guides adapted to retain blocks in parallel columns, a long answer block adapted to be retained in one of said guides, said answer block being longitudinally divided into a plurality of equal basic units, said units being consecutively numbered and being further divided into a plurality of fractional units, and a plurality of smaller number blocks, said number blocks having lengths equal to integral multiples of said basic units and a number corresponding to the length of the block, the thickness of said number blocks corresponding to said fractional units, whereby when said number blocks are arranged both endwise and lengthwise on said base in a column adjacent said answer block, the total length of said column is indicated by the number and fractional unit on said answer block adjacent the upper end of said column of number blocks.

MORRIS F. BOOTH.

REFERENCES CITED

The following references are of record in the file of this patent:

UNITED STATES PATENTS

| Number | Name | Date |
|---|---|---|
| 711,879 | Osborn | Oct. 21, 1902 |
| 971,185 | Freeman, Sr. | Sept. 27, 1910 |
| 979,923 | Boore et al. | Dec. 27, 1910 |
| 1,151,279 | Lewis | Aug. 24, 1915 |
| 1,349,776 | Mackintosh | Aug. 17, 1920 |
| 1,471,437 | Wood | Oct. 23, 1923 |
| 1,594,376 | Passmore | Aug. 3, 1926 |
| 1,649,578 | Deming | Nov. 15, 1927 |
| 1,950,072 | Townsend | Mar. 6, 1934 |